United States Patent [19]
Staples et al.

[11] 3,821,681
[45] June 28, 1974

[54] DUAL RANGE HYDRAULIC THERMOSTATIC CONTROL DEVICE

[75] Inventors: Paul R. Staples; James A. Dooley, both of Louisville, Ky.

[73] Assignee: General Electric Company, Louisville, Ky.

[22] Filed: June 8, 1973

[21] Appl. No.: 368,275

[52] U.S. Cl. ............................................. 337/319
[51] Int. Cl. .......................................... H01h 37/36
[58] Field of Search ..................... 337/319; 219/513

[56] References Cited
UNITED STATES PATENTS
| | | | |
|---|---|---|---|
| 3,096,420 | 7/1963 | Dills | 337/319 |
| 3,354,279 | 11/1967 | Lamar | 219/513 X |
| 3,519,797 | 7/1970 | Kjellberg | 219/513 X |

Primary Examiner—Roy N. Envall, Jr.
Attorney, Agent, or Firm—Richard L. Caslin

[57] ABSTRACT

A dual-range, hydraulic type of thermostat is provided for controlling a pyrolytic, self-cleaning electric baking oven. A calibrated scale is provided associated with a rotary control such that the operator has the maximum resolution of operating temperature for the normal baking operation. A soft detent is incorporated to inform the operator that the Broil position is engaged, and a hard detent is provided with the accompanying shift of operating temperature range to inform that the self-clean process has been engaged. A logic switch, responsive to the operation of the rotary control, is incorporated to insure the proper operating mode of the associated oven circuitry.

12 Claims, 6 Drawing Figures

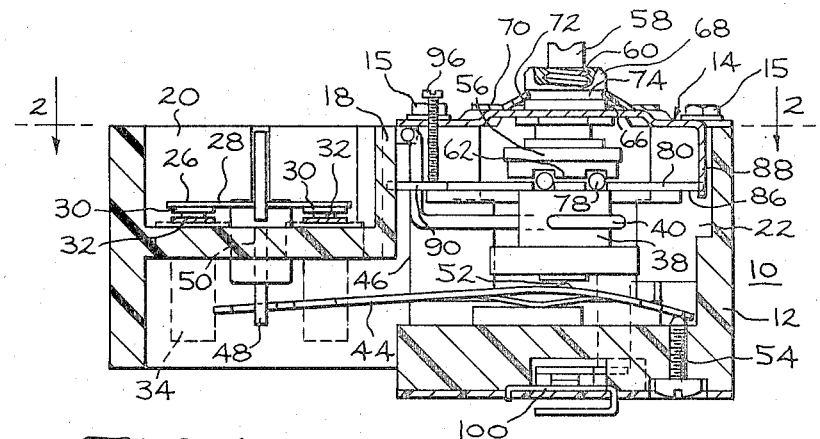

3,821,681

DUAL RANGE HYDRAULIC THERMOSTATIC CONTROL DEVICE

BACKGROUND OF THE INVENTION

The present invention relates to a temperature-responsive control device for making and breaking an electrical circuit in response to predetermined temperatures and more particularly, to a dual range, hydraulic thermostatic control device which is capable of control over two discrete temperature ranges such as is necessary in a self-clean type of baking oven.

The advent of the self-cleaning oven, described in U.S. Pat. No. 3,121,158 — Bohdan Hurko, which patent is assigned to the same assignee as the present invention, created the need for temperature controls having a greater adjustment range than was formerly needed in order to achieve both oven cooking and cleaning temperature regulation. To date, self-cleaning oven temperature controls have generally been of the electric or electronic variety, making use of a biasing signal incorporated into the control to create temperature regulation at the range of self-cleaning temperatures of approximately 850° F and above.

The hydraulic type of thermostatic control devices has been generally used to provide a range of temperature control for the normal baking operation in an electric oven. The hydraulic temperature control design is based on the premise of remotely sensing the expansion and contraction of a fluid contained in a sealed bulb that is located in the area to be heated, such as an oven cavity. The expansion and contraction of the hydraulic fluid is transmitted via a capillary tube to a bellows or diaphragm which converts volumetric expansion into rectilinear motion and by using appropriate linkages and levers, to actuate the interrupting switches that control the energy source for the heating elements in the oven cavity. A preset temp-temperature can thereby be maintained in the cavity.

A useful range of oven temperature control for baking is approximately 150° to 575° F. A suitable temperature for self-cleaning pyrolysis is in the range of 750° – 950° F, preferably approximately 850° F. Furthermore, in order for the user of the oven to have the maximum degree of accuracy for selecting a particular temperature, as by a control knob, the maximum amount of rotational travel of the control knob should be used to cover the baking temperature range. Furthermore, to be able to set the control knob to an 850° F plus self-cleaning temperature, a minimum amount of knob rotation is needed.

A reliable thermostatic control device is needed therefore which can provide good resolution of selectable temperatures across the whole range of normal baking temperature operation of approximately 150° to 575° F. Furthermore, a control device is needed which can also provide a second range of operating temperatures such as is needed for the pyrolitic self-cleaning process in the operating temperature range of 850° F and above.

It is therefore the principal object of the present invention to provide a hydraulic, thermostatic control device for a self-cleaning oven providing the greatest possible amount of temperature set knob of resolution of temperature for the normal baking operation.

It is a further object to provide a thermostatic control device which is capable of providing a second range of temperature such as is needed in the pyrolytic self-cleaning process.

And it is a further object to provide a dual-range, hydraulic, thermostatic control device with independent calibration adjustments for each temperature range, whereby calibration drift due to mechanical wear and the tolerance of the deflection constant of the hydraulic assembly affecting the first range has no effect upon the second range, the calibration mechanisms of the two ranges being completely dissociated.

And it is a still further object of the present invention to provide a dual-range, thermostatic control device which has a logic switch and means for actuating it associated with the rotatable temperature range control knob, the logic switch serving as a protective measure to prevent incorrect mode of operation of the baking oven.

SUMMARY OF THE INVENTION

In accordance with the present invention, there is provided a temperature-responsive control device comprising a generally hollow housing having located therein electrical switch means for making and breaking an electrical circuit located external to the housing. Located also within the housing is a temperature-responsive expansible member and associated therewith is a manually adjustable mechanical biasing means for selecting the temperature at which the expansible member will cause the switch means to open. Lever means responsive to expansion of the expansible member to transfer motion to effect opening and closing of the switch means is provided. Also included is stepping means for selectively incorporating a discontinuity in the mechanical biasing means for effecting a shift in operating temperature ranges of the control device.

BRIEF DESCRIPTION OF THE DRAWING

In the accompanying drawing:

FIG. 1 is a side elevational view, taken in section, to show the operational components of the dual-range, hydraulic thermostatic control device of the present invention, in one form thereof;

FIG. 2 is a view taken generally along the lines 2—2 of FIG. 1;

FIG. 3 is a cross-sectional view taken generally along the line 3—3 of FIG. 2 showing the logic switch as activated for operation in the self-cleaning mode;

FIG. 4 is a view, essentailly as in FIG. 3, however showing the logic switch in position as for the normal baking operation;

DESCRIPTION OF THE PREFERRED EMBODIMENT

Figure 5:
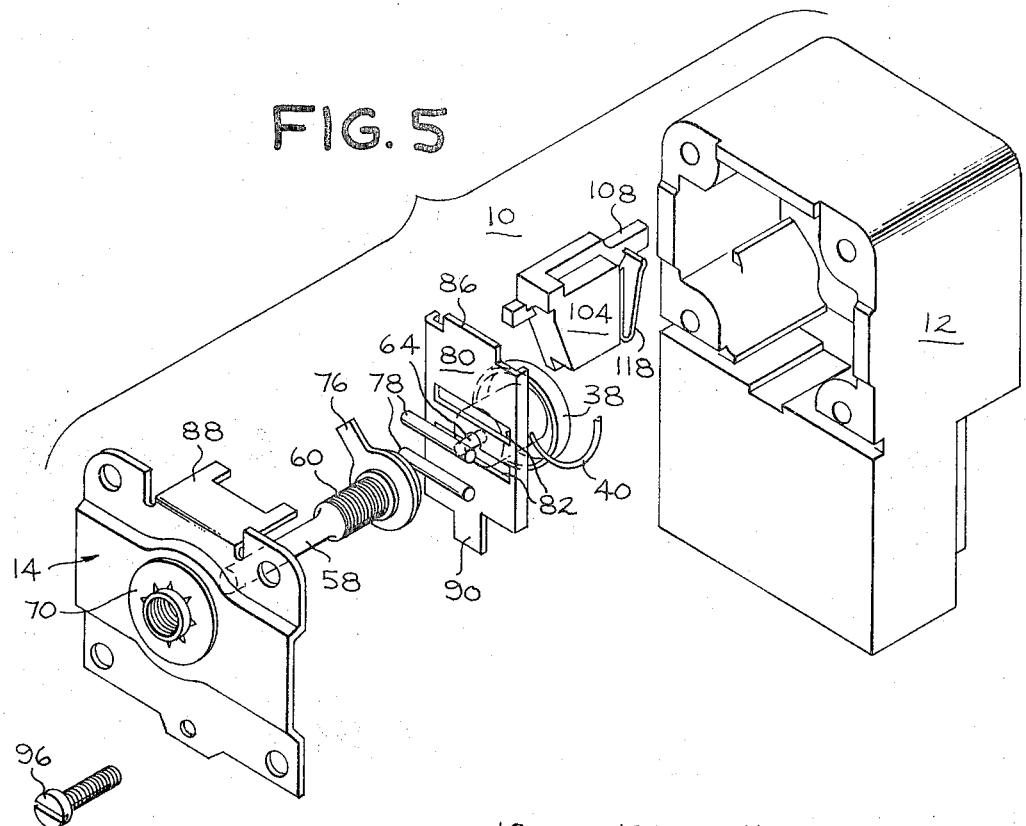
FIG. 5 is an exploded, perspective view of the preferred embodiment of the present invention to better show individual components thereof in relation to each other, the normally closed switch means, the snap-acting spring blade and the logic switch having been omitted for the sake of clarity.

In accordance with the present invention, there is illustrated in FIG. 1 a temperature-responsive control device such as dual-range, hydraulic thermostatic control device 10 as for use with a self-cleaning, pyrolytic type of electric baking oven. A generally hollow housing includes a base member 12 and a cover member 14 securable thereto as by screws 15 for gaining access into the interior of the housing. Housing base member 12 is a box-like member of molded plastic such as phenolic resin or the like insulating material, while the cover member 14 is a sheet metal part. The shape of the base member 12 is generally rectangular in plan view, as is best seen in FIG. 2. Base member 12 has a transverse partition 18 serving to divide the base member into two sections, such as first section 20 and second section 22.

Electrical switch means such as normally closed switch means 26 of the single-throw, double-pole, high-current type is located within first section 20. Switch means 26 includes a blade 28 having a pair of contacts 30, only one set of each appearing in FIG. 1. A fixed set of contacts 32 are also included which are suitably mounted on a set of terminal posts 34. Terminal posts 34 protrude through the wall of housing base member 12 such that they may be tied in with the appropriate electrical circuitry of the self-cleaning oven.

A temperature-responsive, expansible member such as hydraulic, expansible member or bellows 38 is located within second section 22 and is connected by a fluid-filled capillary tube 40 (partly shown) to a remote temperature sensor bulb (not shown) which might be located within the oven cavity. Hydraulic-filled bellows 38 converts volumetric expansion or contraction resulting from temperature change into rectilinear motion acting upon another member, such as a lever, to transfer motion.

Lever means such as snap-acting, energy storing of spring-type lever or spring blade 44, is provided responsive to expansion and contraction of bellows 38 to transfer motion to effect opening and closing of switch means 26. Snap-acting spring blade 44 may be of the type described in U.S. Pat. Nos. 3,293,394 and 3,348,009, Paul R. Staples, both assigned to the same assignee as the present invention. As such, spring blade 44 is located within the housing base 12 so as to be seated in second section 22 thereof and extending through an opening 26 in transverse partition 18 so as to project into first section 20, where it is coupled with switch means 26 by an insulating member 48 which projects through an opening 50 in the wall of the housing base member 12. Switchblades 28 are supported and suspended by this insulating member 48. Switchblades 28 are supported and suspended by this insulating member 48. Spring blade 44 is engageable by bellows 38 at point 52 such that upon expansion of bellows 38 due to an elevated temperature, pressure exerted by bellows 38 upon spring blade 44 at point 52 causes the snap-acting spring blade 44 to effect separation of contacts 30 away from contacts 32, in effect causing normally closed switch means 26 to open. An adjusting screw 54 is provided in the bottom wall of base member 12 and which extends in a vertical manner and underlies the pivotal end of spring blade 44. By adjusting this calibration screw 54 it is possible to change the hysteresis or temperature differential between the ON and OFF temperatures of the control device.

It is necessary to be able to adjust the position of the bellows 38 toward or away from the spring blade 44 for setting various desired temperature levels. To this end, manually adjustable, mechanical biasing means 56 is provided bearing against bellows 38 so as to provide a means for biasing bellows 38 for selection of the temperature at which bellows 38 will cause switch means 26 to be open. Included is an elongated rotatable shaft 58 having a portion thereof provided with lefthand screw threads 60 (shown clearly in FIG. 5) and an enlarged flat base portion 62 provided with means for coaxially engaging bellows 38 such as a small, centered hole (not shown) for freely receiving a vertical pin 64 (seen in FIG. 5) protruding from the top side of bellows 38. Shaft 58 is threaded by screw thread 60 into a shouldered threaded bushing 66 located within an opening 68 in cover member 14 such that shaft 58 may be manually turned by a knob (not shown) so as to vary the bias of bellows 38. Bushing 66 is securely held within cover member 14 by a deformable, annular clip 70 such as a speed nut secured to the bushing 66. Clip 70 is provided with a series of radially spaced prongs 72 which snap into an annular groove 74 on bushing 66 so as to prevent bushing 66 from rotating when shaft 58 is turned. A description of the assembly of clip 70 with bushing 66 is presented in the aforementioned U.S. Pat. No. 3,293,394. Also forming part of the biasing means 56 is a radial finger member 76, which, among other things, serves as a stop means to limit the angle of rotation of the shaft 58 to something slightly less than 360°.

Stepping means are provided for selectively incorporating a discontinuity in biasing means 56 for effecting a shift in operating temperature ranges of control device 10 so as to yield two distinct operating ranges. The stepping means includes bearing means such as a pair of roller bearings 78 or the like (more clearly shown in FIG. 5) disposed between flat base portion 62 of biasing means 56 and a flat portion of bellows 38 both serving as bearing surfaces for roller bearings 78. The stepping means also includes a flat, elongated, bearing retainer plate 80 having a pair of parallel slots 82 for captively holding bearings 78 in place. Corresponding to slots 82 is a pair of grooves located in flat base portion 62 of biasing means 56. As is clearly shown in FIG. 1, grooves 84 are located slightly off center with respect to the common axis of shaft 58 of biasing means 56 and bellows 38 such that roller bearings 78 will be allowed to slip into grooves 84 at only one position during a complete rotation of shaft 58. Retainer plate 80 is located by vertical pin 64 and is held in place by a tongue 86 which fits into a bent-down prong 88 of cover member 14. In the other end of retainer plate 80 is a second tongue 90 which locates in a slot formed in transverse partition 18 of housing base member 12. Slots 82 and grooves 84 also serve as a reservoir to hold and dispense lubricating material, such as grease, for roller bearings 78, retainer plate 80 serving to hold roller bearings 78 in place and at the same time allowing them to rotate in place so as to evenly distribute wear upon the bearings 78.

To realize the significant discontinuity from one temperature range to another, roller bearings 78 are allowed to act as bearings between bearing surfaces formed by bellows 38 and the surface 62 of shaft 58. Since bearings 78 are captured and prevented from rotating about the center line of bellows 38 by retainer plate 80, throughout the lower or first temperature range, or that of the normal baking process, roller bearings 78 separate bellows 38 and biasing means 56 by a finite amount. As stated, the roller bearings 78 are positioned off-center with respect to bellows 38 centering pin 64 and corresponding off-center clearance slots or grooves 84 are provided on base portion 62 of biasing means 56 such that bearingo 78 will be allowed to slip therein at only one position during a complete rotation of shaft 58. The depth of the grooves 84 is great enough such that roller bearings 78 will not bottom out before retainer plate 80 supports and positions bellows 38. By removing roller bearing 78 from supporting bellows 38, bellows 38, now supported by retainer plate 80, must expand more to reach the operating point of spring blade 44 controlling the cylical operation of switch means 26; a second operating temperature range is thereby incorporated in thermostatic control device 10.

Bushing 66 serves as temperature calibration means for the first operating temperature range, the normal baking operation, such that bushing 66 may be grasped, as by a pair of pliers, and rotated while shaft 58 is held fixedly. A screw 96 is provided threadedly engaged with cover member 14 such that it bears adjustably against tongue 90 of retainer plate 80, thereby serving as temperature calibration means for the second temperature range, such as that for the self-cleaning operation. Independent calibration adjustment is afforded thereby for each temperature range. Moreover, bearing wear and bearing surface wear have no effect upon the calibration of the second temperature range, the calibration mechanisms of the two ranges being completely dissociated from each other.

Figure 6:
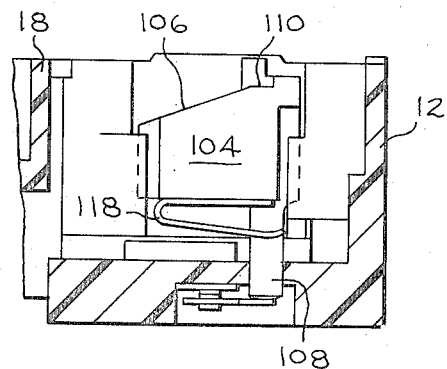
FIG. 6 is a fragmentary view, partly broken away, taken generally along the line 6—6 of FIG. 4 to show the relationship of the cam member with the logic switch which it activates.

A logic switch, such as single-pole, double-throw logic switch 100, is mounted within the lower portion of housing base member 12. Logic switch 100 is responsive to the position of rotary shaft 58, and more particularly, to radially disposed finger 76 (seen in FIG. 2) mounted on shaft 58, bearing against a camming surface such as vertically movable cam member 104 retained within a slot in a side wall of housing base member 12 to effect switching of logic switch 100. Logic switch 100 is incorporated to prevent the operation of certain circuitry during pre-determined temperature ranges as for example, in a self-cleaning oven, to lock out the self-clean circuitry from the main power handling circuit during the bake, time-bake, broil and rotisserie modes of oven operation. Referring to FIGS. 5 and 6, it can be seen that cam member 104 has been designed such that the operator will feel a slight pressure or soft detent when he turns the knob associated with shaft 58 to the temperature or position denoted as Broil, (not shown) by virtue of the contacting of finger 76 with the camming surface 106 of cam 104. An extension 108 is provided on cam 104 such that, upon rotation of shaft 58 so that the knob will align with the calibrated position for the self-clean process, finger 76 will force cam 104 downward until finger 76 comes to rest against a stop on the flat 110 of cam member 104. This flat 110 serves as a hard detent to denote the self-clean process; however, cam 104 has been pushed downward, the effect being that extension 108 makes contact with blade member 112 of logic switch 100. This is clearly shown in FIG. 3 wherein it can be further seen that blade member 112 is then caused to make contact with a set of contacts 114.

Referring now to FIG. 4, during the normal baking operation of the oven, finger 76 makes no contact with cam member 104 therefore blade member 112 of logic switch 100 is in contact with a second set of contacts 116 (also seen in FIG. 6). When no pressure is exerted upon cam 104 by finger 76, a spring member 118 associated with cam 104 causes cam 104 to snap back to its normal up position such that blade member 112 makes contact with second contacts 116 thereby providing an indication of the normal, baking operation to the appropriate circuitry.

Heretofore mention has been made of a knob associated with shaft 58 of thermostatic control device 10. Thermostatic control device 10 has been devised primarily to serve as the primary temperature control means for an electric, self-cleaning oven. Control device 10 therefore would normally be supplied with a circular scale to be used in conjunction with the knob mounted on shaft 58. Such a scale would be calibrated to point out the two ranges of temperature which it is capable of controlling and would also be calibrated to read temperature and degrees Fahrenheit, for example, for the normal baking operation. Since the normal baking operation is confined within the range of from 150° to 575° F, thermostatic device 10 has been designed such that this range of temperature control will be spread across approximately 330 angular degrees of rotation of shaft 58. 575° F coincides with the point at which radial finger 76 makes initial contact with camming surface 106 of cam 104, the soft detent, this point denoted as Broil on the calibrated scale. To effect the range shaft of approximately 300° F so as to place the oven in the self-clean mode, it is necessary to rotate shaft 58 approximately 18 angular degrees further, at which point radial finger 76 makes contact with the stop on flat 110 of cam 104. Since this stop occupies a few angular degrees, shaft 58 is able to rotate then throughout approximately 350 angular degrees. Therefore, the maximum amount of rotational travel of the knob and shaft 58 has been used to cover the temperature range for the normal baking operation, thereby giving the greatest possible resolution to the operator of the oven. Further, for the operator to be able to shift into the second operation range, that of the self-cleaning process, only a minimum amount of knob and shaft 58 rotation is needed.

In normal operation, bellows 38 expands due to a rise in temperature in the oven causing expansion of the liquid within the remote sensor bulb. This expansion results in the opening of switch means 26 causing the removal of power from the heating elements in the oven. Upon cooling, then, the liquid in the sensor bulb contracts somewhat and so does bellows 38 allowing switch means 26 to close and power is again applied to the heating elements within the oven. This cylical operation continues until such time as the operator cuts off the main power from the oven.

While the invention that has been heretofore described has been adapted primarily for use in a pyrolytic self-cleaning type of electric baking oven having need for a temperature discontinuity between operating ranges of about 300° F, it should be understood that this invention is not limited to such an application. For example, this range of discontinuity may be varied by changing the diameter of the roller bearings 78 and the thickness of retainer plate 80. Furthermore, it is possible to incorporate other operating temperature ranges by providing other sets of grooves such as 84 having varying depth.

It should be apparent to those skilled in the art that the embodiment described heretofore is considered to be the presently preferred form of this invention. In accordance with the patent statutes, changes may be made in the disclosed apparatus in the manner in which it is used without actually departing from the true spirit and scope of this invention.

What is claimed is:

1. A temperature-responsive control device comprising:
   a generally hollow housing;
   electrical switch means mounted within said housing for making and breaking an electrical circuit located external to said housing;
   a temperature-responsive expansible member located within said housing;
   lever means responsive to expansion of said expansible member to transfer motion to effect opening and closing of said switch means;
   manually adjustable mechanical biasing means associated with said expansible member for selecting a temperature at which said expansible member will cause said switch means to open; and
   stepping means for selectively incorporating a discontinuity in said mechanical biasing means for effecting a shift in operating temperature ranges of said control device thereby providing at least two operating temperature ranges.

2. A dual range, temperature-responsive control device comprising:
   a generally hollow housing including a cover member for gaining access into the housing;
   normally closed, electrical switch means mounted within said housing;
   a temperature-responsive expansible member located within said housing;
   a snap-acting, spring type lever responsive to expansion and contraction of said expansible member to transfer motion to effect opening and closing of said switch means;
   manually adjustable, mechanical biasing means associated with said expansible member and having a rotatable shaft extending through one wall of said housing for selecting a bias corresponding to a given temperature at which said expansible member will cause said switch means to open the biasing means including means for coaxially locating with said expansible member;
   mechanical stepping means associated with said mechanical biasing means for selectively incorporating a discontinuity therein for selectively effecting a shift in operating temperature ranges of said control device.

3. The invention of claim 2 wherein said expansible member is a hydraulic bellows connected by a fluid-filled capillary tube to a remote temperature sensor bulb, the bellows having a flat portion engageable by said biasing means.

4. The invention of claim 3 wherein said mechanical biasing means has said rotatable shaft provided with screw threads, said shaft being engageable with a shouldered, threaded bushing located within an opening of one wall of said housing, the threaded bushing being held therein by a deformable annular clip member affixed to one end of the bushing, said shaft including an enlarged flat base portion for engaging said expansible member.

5. The invention of claim 4 wherein the mechanical stepping means includes bearing means disposed between said expansible member flat portion and the flat base portion of said rotatable shaft, a flat elongated bearing retainer plate having slot means for retaining said bearings, the plate being interposed between the shaft flat portion and said expansible member, and recesses located in the flat base portion of said rotatable shaft such that the bearings will locate therein only during one particular orientation of said shaft.

6. A dual range, hydraulic thermostatic control device comprising:
   a hollow housing including a base member and a cover member, the base member having a transverse partition dividing the base into two sections;
   normally closed, electrical switch means located within a first section of said housing;
   a hydraulic temperature-responsive, expansible member located within a second section of said housing, the expansible member being connected by a fluid-filled capillary tube to a remote temperature sensor bulb;
   a snap-acting, energy storing spring blade seated in said second section and extending through an opening in said transverse partition into said first section, the spring blade being engageable by said expansible member and mechanically coupled with said switch means to effect opening and closing thereof in response to expansion and contraction of said expansible member;
   manually adjustable, mechanical biasing means having a rotatable shaft provided with screw threads and an enlarged flat base portion having means for coaxially engaging a locating member associated with said expansible member, the shaft being engageable with a shouldered, threaded bushing located within an opening in the cover member such that the shaft protrudes into said second housing section, the bushing being held within said cover opening by a deformable annular clip secured to one end of the bushing, the biasing means selectively providing a bias to said expansible member for manually selecting a temperature at which said expansible member will cause said switch means to open;
   mechanical stepping means associated with said biasing means for selectively incorporating a discontinuity therein for selectively effecting a shift in operating temperature ranges of said control device so as to provide two operating temperature ranges, the stepping means including a pair of roller bearings disposed between a flat portion of said expansible member and said flat base portion of said rotatable shaft, a flat elongated bearing retainer plate interposed between said shaft flat portion and said expansible member and having a pair of off-center slots for holding captive the bearings, and a pair of grooves located in said flat base portion of said shaft corresponding to the slots in said retainer plate such that said rollers will locate therein only during a predetermined orientation of said shaft;
   a logic switch located within said housing for effecting operation only of desired circuits; and
   means associated with said rotatable shaft for effecting switching of said logic switch when a shift in operating ranges of said control device is effected.

7. The invention of claim 6 wherein the normally closed switch means is of a single-throw, double-pole, high current type.

8. The invention of claim 7 wherein said snap-acting spring blade is coupled with said switch means by an insulating member.

9. The invention of claim 8 wherein said bushing of said biasing means serves as temperature calibration means for said expansible member such that said bushing may be rotated while said shaft is fixedly held, and a screw is threadably mounted within said housing cover so as to bear adjustably on one end of said bearing retainer plate to effect temperature calibration of a second temperature range.

10. The invention of claim 9 wherein a cam is provided responsive to pressure from a radially disposed finger mounted on said shaft to effect switching of a single-pole, double-throw logic switch.

11. The invention of claim 10 wherein said cam provides a soft detent such that an operator might sense the change of position and of temperature setting of said rotatable shaft.

12. The invention of claim 6 wherein said mechanical stepping means provides a reservoir to hold and dispense lubricating material for said bearings, and further, said stepping means allows for rolling of said bearings so as to evenly distribute the wear thereupon.

* * * * *